US006899379B1

(12) United States Patent
Milenovich

(10) Patent No.: US 6,899,379 B1
(45) Date of Patent: May 31, 2005

(54) MODULAR SLEEPING COMPARTMENT FOR TRUCKS

(75) Inventor: Milen Milenovich, Paris (FR)

(73) Assignee: Mack Trucks, Inc., Allentown, PA (US)

( * ) Notice: Subject to any disclaimer, the term of this patent is extended or adjusted under 35 U.S.C. 154(b) by 6 days.

(21) Appl. No.: 10/089,232

(22) PCT Filed: Oct. 19, 2000

(86) PCT No.: PCT/US00/28817

§ 371 (c)(1),
(2), (4) Date: Jul. 18, 2002

(87) PCT Pub. No.: WO01/30639

PCT Pub. Date: Oct. 19, 2000

Related U.S. Application Data

(60) Provisional application No. 60/160,889, filed on Oct. 22, 1999.

(51) Int. Cl.[7] ............................................. B60R 27/00
(52) U.S. Cl. ........................... 296/190.02; 296/190.08; 296/66; 296/37.6; 296/37.15; 297/335; 297/14
(58) Field of Search ..................... 296/190.02, 190.08, 296/66, 65.01, 65.05, 37.6, 37.15; 297/337, 297/335, 14

(56) References Cited

U.S. PATENT DOCUMENTS 1,387,083 A   8/1921   Welch
1,432,244 A * 10/1922  Haskins ........................ 296/66
1,841,992 A   1/1932   Thompson
2,472,185 A   6/1949   Apel (Continued)

FOREIGN PATENT DOCUMENTS

GB          1 549 901 A    8/1979

*Primary Examiner*—Joseph D. Pape
(74) *Attorney, Agent, or Firm*—Rothwell, Figg, Ernst & Manbeck, PC

(57) ABSTRACT

A sleeping compartment (10) for a truck is made up of a plurality of pre-assembled sections or modules including a first type (14, 14', 14") having one or more seats and a second type (16, 86, 86' , 86") having a bed. In accordance with one aspect of the invention, a seat (60) is mounted on a sidewall (22, 22', 22") of the first type of module and includes a seat bottom (66) moveable from a substantially vertical stowed position against the side wall and a substantially horizontal deployed position. A seat support (34) mounted on the floor (20) is movable from a stowed position substantially flush with the floor of the first type of module to a deployed position protruding upwardly from the floor to support the seat bottom in the deployed position. The seat support is preferably a door panel covering a storage space (32) beneath the floor which is accessible from outside the sleeping compartment. In accordance with another aspect of the invention, the bed (96, 96') in the second type of module is moveable between a stowed position with its sleeping surface vertically oriented and an extended position with its sleeping surface horizontally oriented. The second type of module can also include a table (98) deployable from a bottom surface of the bed and one or more cabinets (94, 94', 104, 106).

18 Claims, 15 Drawing Sheets

U.S. PATENT DOCUMENTS

| | | |
|---|---|---|
| 2,857,977 A | 10/1958 | Bock |
| 3,006,001 A | 10/1961 | Llewellyn |
| 3,588,168 A | 6/1971 | Froitzheim |
| 3,652,121 A | 3/1972 | Hjelm |
| 3,879,081 A | 4/1975 | Hockley et al. |
| 4,215,899 A | 8/1980 | Schmidt et al. |
| 4,527,828 A | 7/1985 | Groce et al. |
| 4,632,457 A | 12/1986 | Hofrichter et al. |
| 4,664,438 A | 5/1987 | Crepaldi |
| 4,775,179 A | 10/1988 | Riggs |
| 4,832,404 A | 5/1989 | Baymak et al. |
| 5,029,929 A | 7/1991 | Sjostrom et al. |
| 5,310,239 A | 5/1994 | Koske et al. |
| 5,516,179 A | 5/1996 | Tidwell |
| 5,638,560 A | 6/1997 | Rigdon et al. |
| 5,735,568 A | 4/1998 | Arnold |

\* cited by examiner

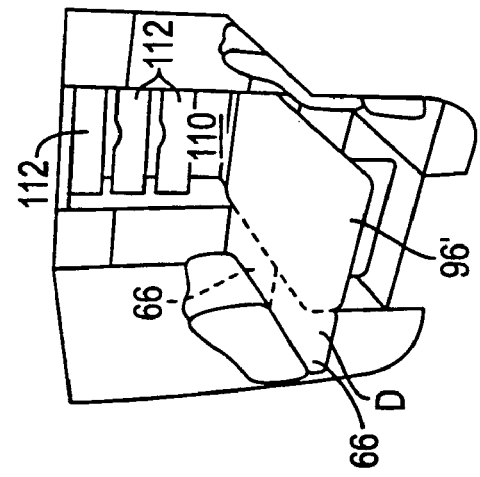
FIG. 23
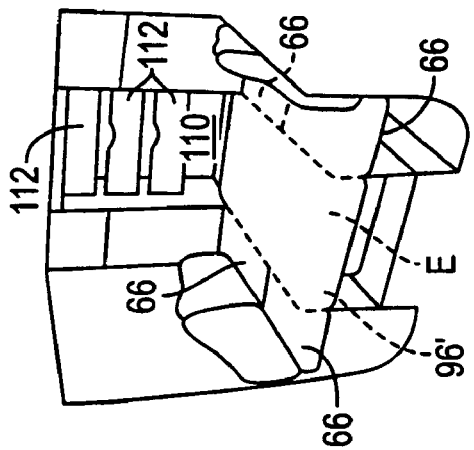
FIG. 25
FIG. 24

MODULAR SLEEPING COMPARTMENT FOR TRUCKS

CROSS-REFERENCE TO RELATED APPLICATIONS

This application claims priority from U.S. Provisional Application Ser. No. 60/160,889, filed Oct. 22, 1999, the disclosure of which is incorporated herein by reference.

BACKGROUND OF THE INVENTION

1. Field of the Invention

The present invention relates generally to the field of sleeping compartments for trucks and, more particularly, to a modular sleeping compartment for trucks.

2. Description of the Background Art

It is well known to provide trucks with sleeping compartments, particularly in the case of tractor-trailer trucks intended for operation over long distances. A typical sleeping compartment for a truck includes one or more sleeping bunks for the truck operators, and may include storage areas for luggage, tools, and the like, as well as convenience items such as a small refrigerator.

There are several methods of fabricating a sleeper compartment for a truck. In one method, exemplified by U.S. Pat. No. 3,588,168 to Froitzheim et al, the sleeper compartment and truck cab are manufactured integrally as a single unit. In another method, exemplified by U.S. Pat. No. 4,775,179 to Riggs, U.S. Pat. No. 5,310,239 to Koske et al., and U.S. Pat. No. 5,735,568 to Arnold, the sleeper compartment and the truck cab are manufactured separately as individual units and connected to one another and/or the chassis frame. In both cases, customization of the sleeper compartment is usually limited to a selection of interior amenities. Some manufacturers produce sleeping compartments in more than one length, but these compartments are typically manufactured in the traditional manner by constructing a frame having the desired dimensions and attaching panels to the frame to complete the structure. Each length is manufactured as if it were a distinct product, requiring additional design work and operation of separate production lines or constant retooling of a single production line. The additional cost and inefficiency associated therewith tend to limit the amount of customization offered by manufacturers while at the same time increasing the cost of customization for the consumer.

There remains a need in the art for a sleeping compartment which can be manufactured in a variety of sizes and configurations to suit individual operator needs in a cost effective manner. There is also a need in the art for a sleeping compartment having increased floor space and storage volume.

SUMMARY OF THE INVENTION

The present invention is generally characterized in a sleeping compartment for a truck made up of a plurality of pre-assembled sections or modules including a first type of module having one or more seats and a second type of module having a rear wall panel and/or a bed. In accordance with one aspect of the invention, a seat is mounted on a sidewall of the first type of module and includes a seat bottom moveable from a substantially vertical retracted or stowed position against the sidewall and a substantially horizontal deployed position. A seat support mounted on the floor is movable from a retracted or stowed position substantially flush with a floor of the first type of module to a deployed position protruding upwardly from the floor to support the seat bottom in the deployed position. The seat support is preferably a door covering a storage space beneath the floor which is also accessible from outside the sleeping compartment, the storage space expanding with deployment of the seat bottom and door to provide additional storage volume capable of receiving larger objects. In accordance with another aspect of the invention, the second type of module includes a bed that is moveable between a retracted or stowed position with its sleeping surface vertically oriented and an extended position with its sleeping surface horizontally oriented. The second type of module can also include a retractable table integral with the bed and one or more cabinets. The beds, seats and tables in the various modules are preferably completely retractable to provide increased floor space when not in use.

Sleeping compartments in a variety of sizes and configurations can be rapidly manufactured in a cost-effective manner by combining one or more prefabricated modules of the first type with a prefabricated module of the second type.

The above and other features and advantages of the present invention will be further understood from the following description of the preferred embodiments thereof, taken in conjunction with the accompanying drawings wherein like reference numerals denote like parts.

BRIEF DESCRIPTION OF THE DRAWINGS

FIG. 23 is a fragmentary perspective view of the modular sleeping compartment of FIG. 19 with the seats stowed and the bed deployed.

FIG. 24 is a fragmentary perspective view of the modular sleeping compartment of FIG. 19 with one seat stowed and the other seat deployed to increase the width of the deployed bed.

FIG. 25 is a fragmentary perspective view of the modular sleeping compartment of FIG. 19 with both seats deployed to increase the width of the deployed bed.

DETAILED DESCRIPTION OF THE PREFERRED EMBODIMENTS

Figure 1:
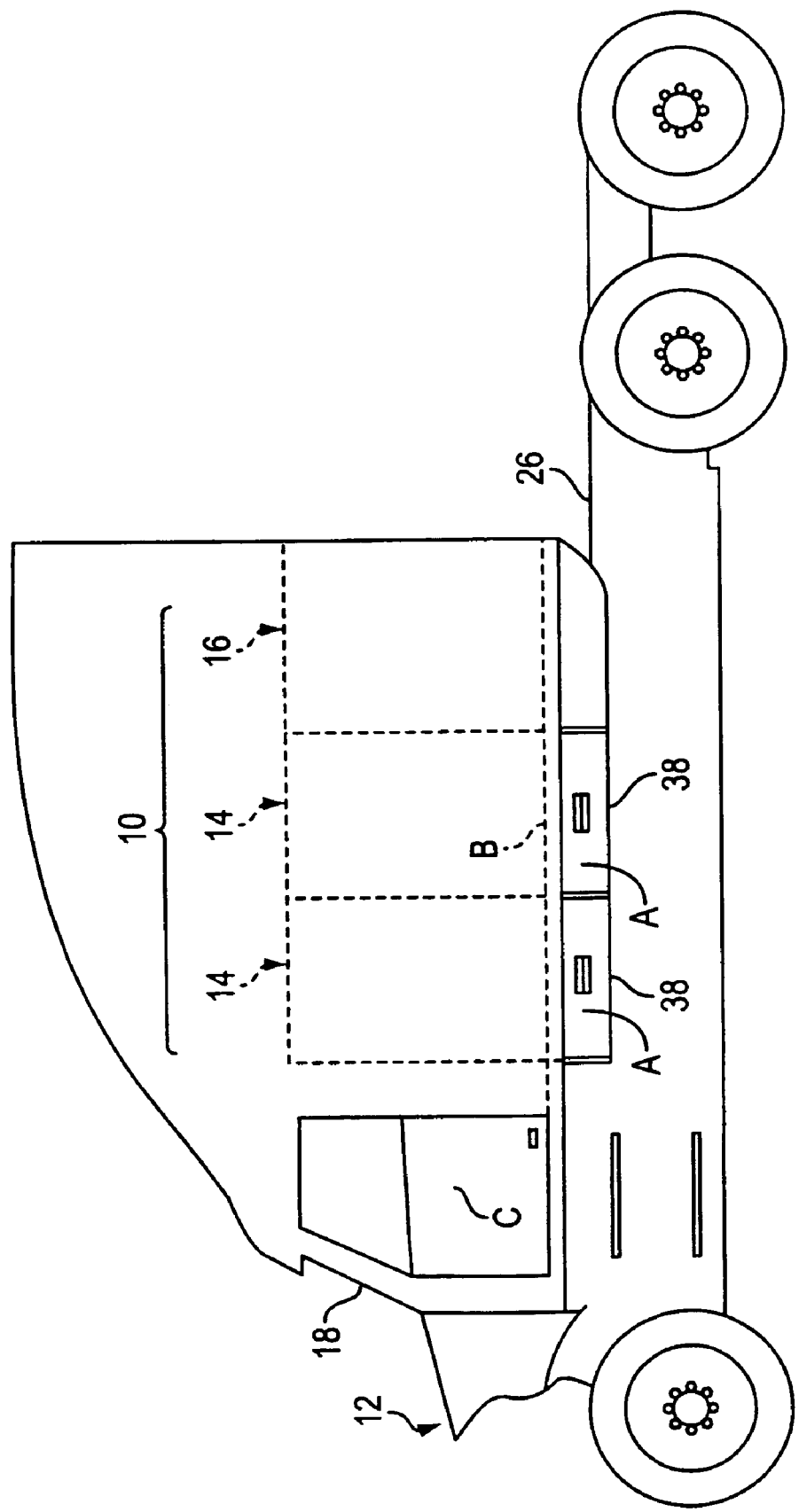
FIG. 1 is a fragmentary side view of a truck having a cab and a modular sleeping compartment according to the present invention.
Figure 2:
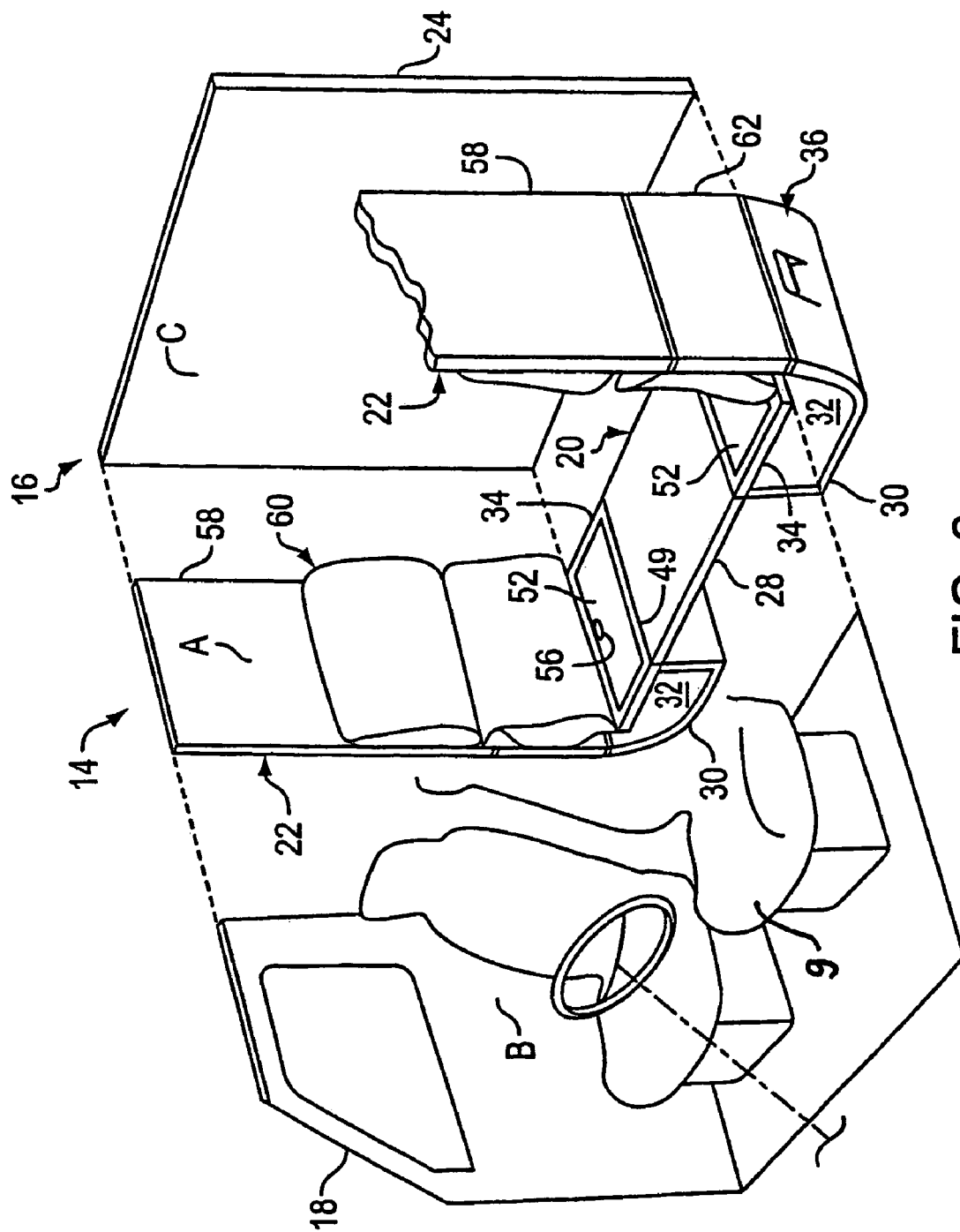
FIG. 2 is an exploded perspective view, partially broken, of an embodiment of a modular sleeping compartment according to the present invention made up of two modules disposed aft of a truck cab.

A sleeping compartment 10 for a truck 12 according to the present invention is made up of a plurality of modules or sections 14 and 16 of uniform cross-section configured to mate with one another to form an integral sleeper unit for connection to the aft end of a truck cab compartment 18 as shown in FIG. 1. Cab compartment 18 has at least a driver's seat 9 contained therein, and may also contain a passenger seat as shown in FIG. 2. The modular construction of the sleeping compartment makes it possible to provide customized sleeping compartments of various lengths with a wide variety of amenities using only a few types of modules.

FIG. 2 shows a sleeping compartment 10 of one embodiment of the present invention in an exploded perspective view. In this embodiment, the sleeping compartment is made up of two modules or sections 14 and 16. The first or forward module 14 is a floor/sidewall assembly defining the floor and sidewalls of the compartment, and the second or rear module 16 is a rear assembly defining a rear wall of the compartment. Forward module 14 is shown as a generally U-shaped structure including a floor 20 and a pair of laterally spaced sidewalls 22 extending upwardly from opposite edges of the floor. Rear module 16 is shown as a flat wall panel 24 of generally rectangular configuration having dimensions to cover the aft end of module 14.

Forward module 14 is configured to be mounted on a chassis frame 26 of a truck 12 aft of truck cab 18 as shown in FIG. 1. If the cross-sectional configuration of the aft end of cab 18 is compatible with the cross-sectional configuration of forward module 14, the cab and the forward module can be connected together directly as shown in FIG. 1. For cabs with different cross-sectional configurations, an adapter module (not shown) which transitions from one cross-section to the other can be inserted between the forward module and the cab. The rear module 16 shown in FIG. 1 is configured to be mounted directly onto the aft end of forward module 14. The sleeping compartment can be mounted on the chassis frame in any conventional manner and can be connected directly to the cab as shown or remain structurally independent of the cab.

Figure 3:
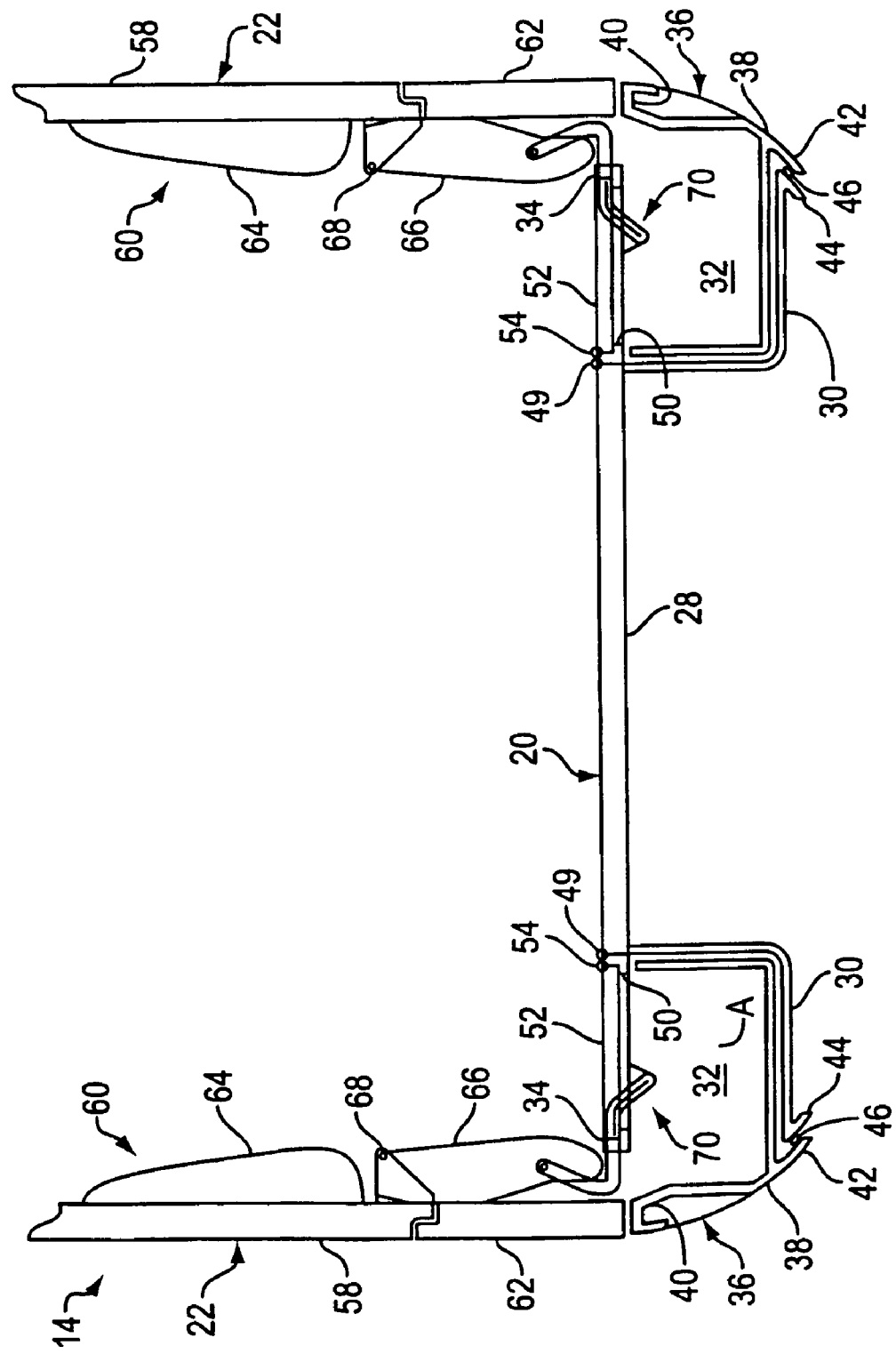
FIG. 3 is a sectional view of the forward module shown in FIG. 2 illustrating storage bins stowed in space beneath the floor of the module.

Referring to FIGS. 2 and 3, it can be seen that floor 20 of forward module 14 includes a planar inboard portion 28 configured to extend laterally across the chassis frame of a truck and a pair of concave outboard or lateral portions 30 extending downwardly from opposite lateral edges of the inboard portion to define storage areas 32 on opposite sides of the chassis frame. Trap doors 34 hinged along opposite lateral edges of inboard floor portion 28 are shown in stowed positions in FIGS. 2 and 3 wherein the trap doors extend over concave outboard floor portions 30 in substantially coplanar relation with the inboard floor portion to define a substantially flat horizontal floor surface wider than the chassis frame (i.e., a full width flat floor).

Figure 4:
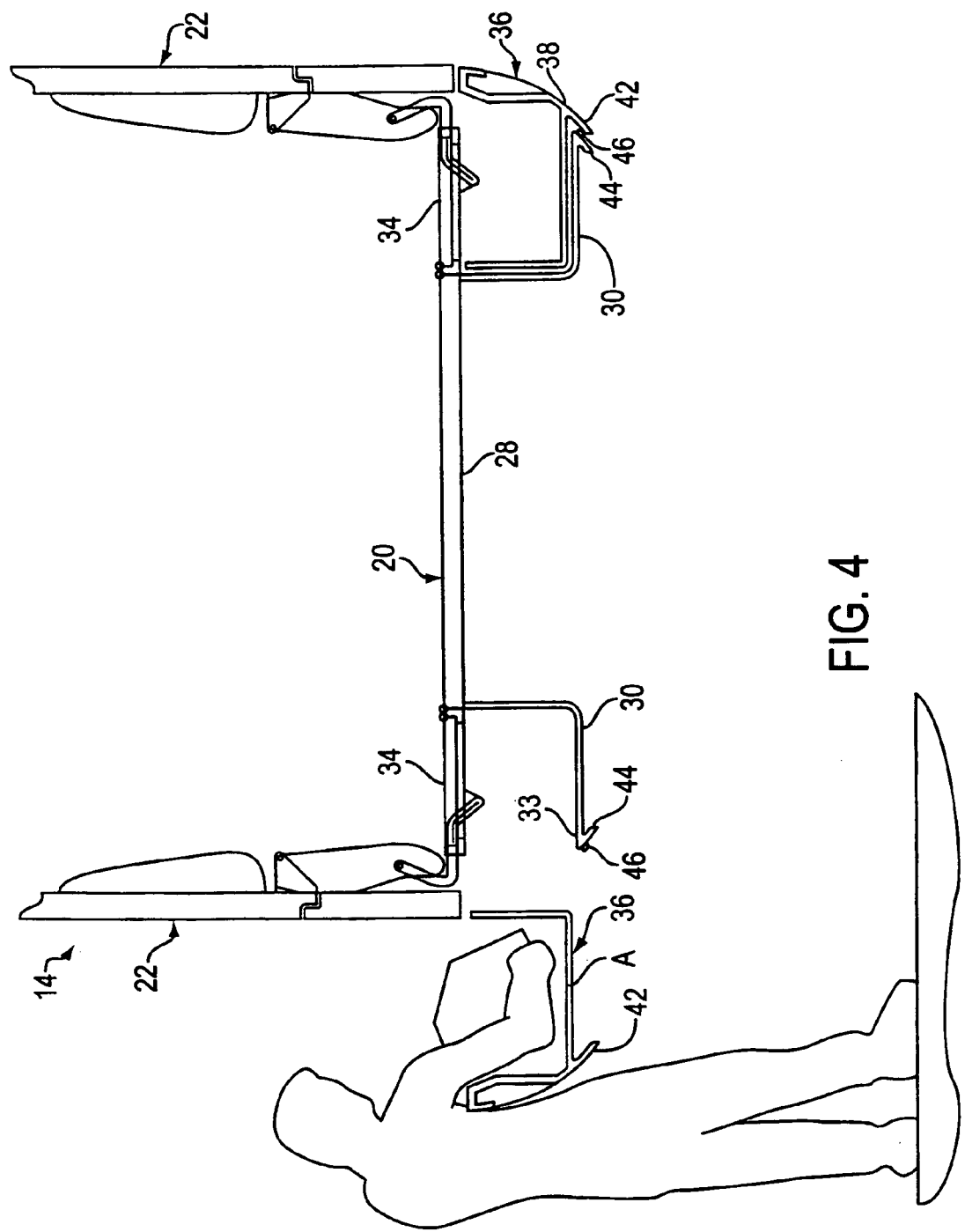
FIG. 4 is a sectional view of the forward module shown in FIG. 3 with a storage bin accessed from outside the module.
Figure 5:
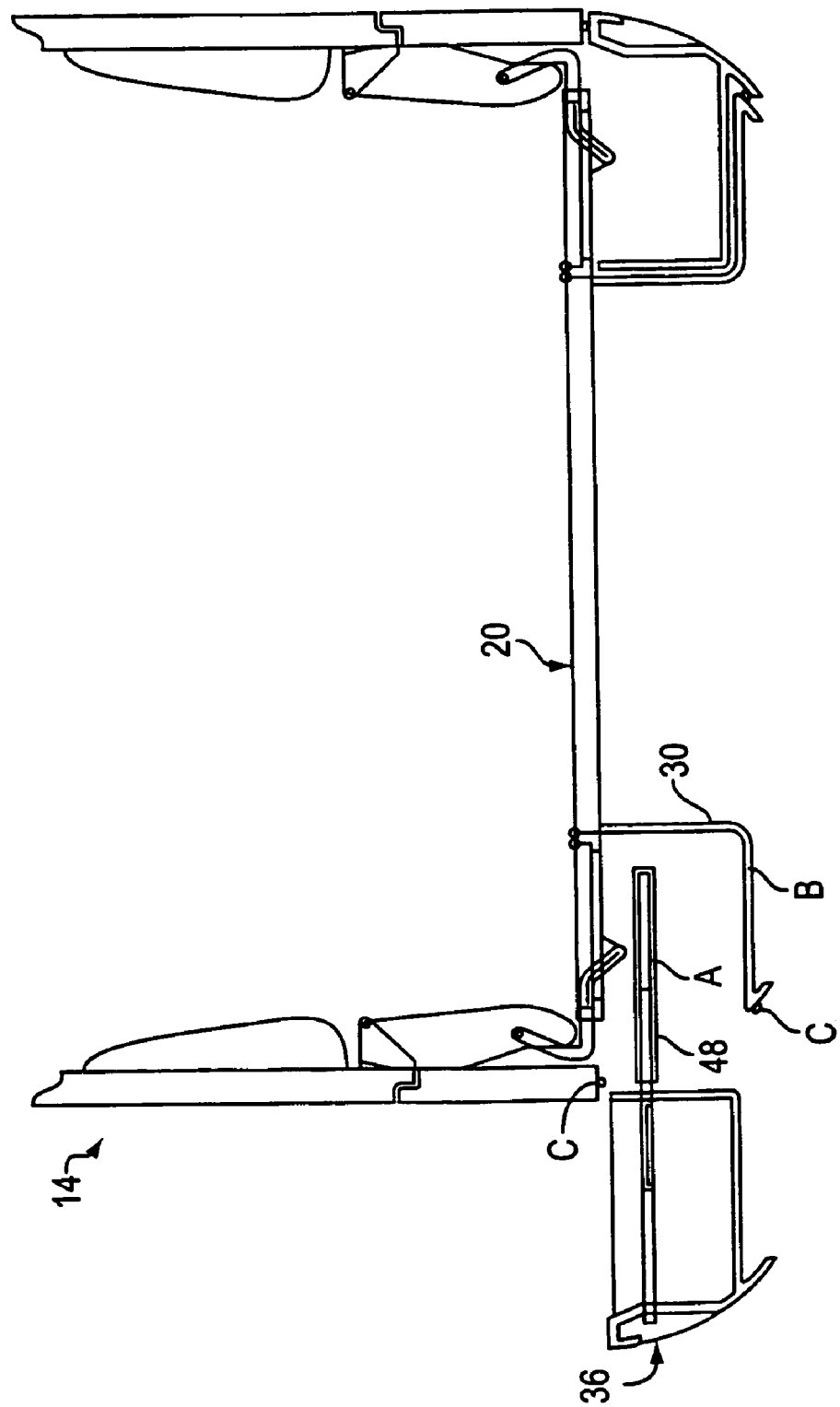
FIG. 5 is a sectional view of a modification of the forward module shown in FIG. 3 illustrating a sliding mechanism.

Referring to FIGS. 2–4, it can be seen that outboard floor portions 30 of the floor are each generally L-shaped in cross-section, extending perpendicularly downward from respective lateral edges of inboard floor portion 28 and bending laterally outward in opposite directions to define elongate storage compartments, spaces or areas 32 beneath the floor alongside the chassis frame. The under-floor storage areas 32 defined by outboard floor portions 30 open laterally outward on both sides of forward module 14 to define openings 33 that permit access to the storage space from outside the sleeping compartment. Optional storage bins or drawers 36 are shown inserted into storage areas 32; however, the exterior opening of either storage area can be covered with a door or a fixed panel if desired. Although illustrated as being open, forward and aft ends of outboard floor portions 30 can be covered by panels (not shown) which can structurally reinforce the module and/or mount optional accessories such as rails for the drawers (FIG. 5).

Figure 6:
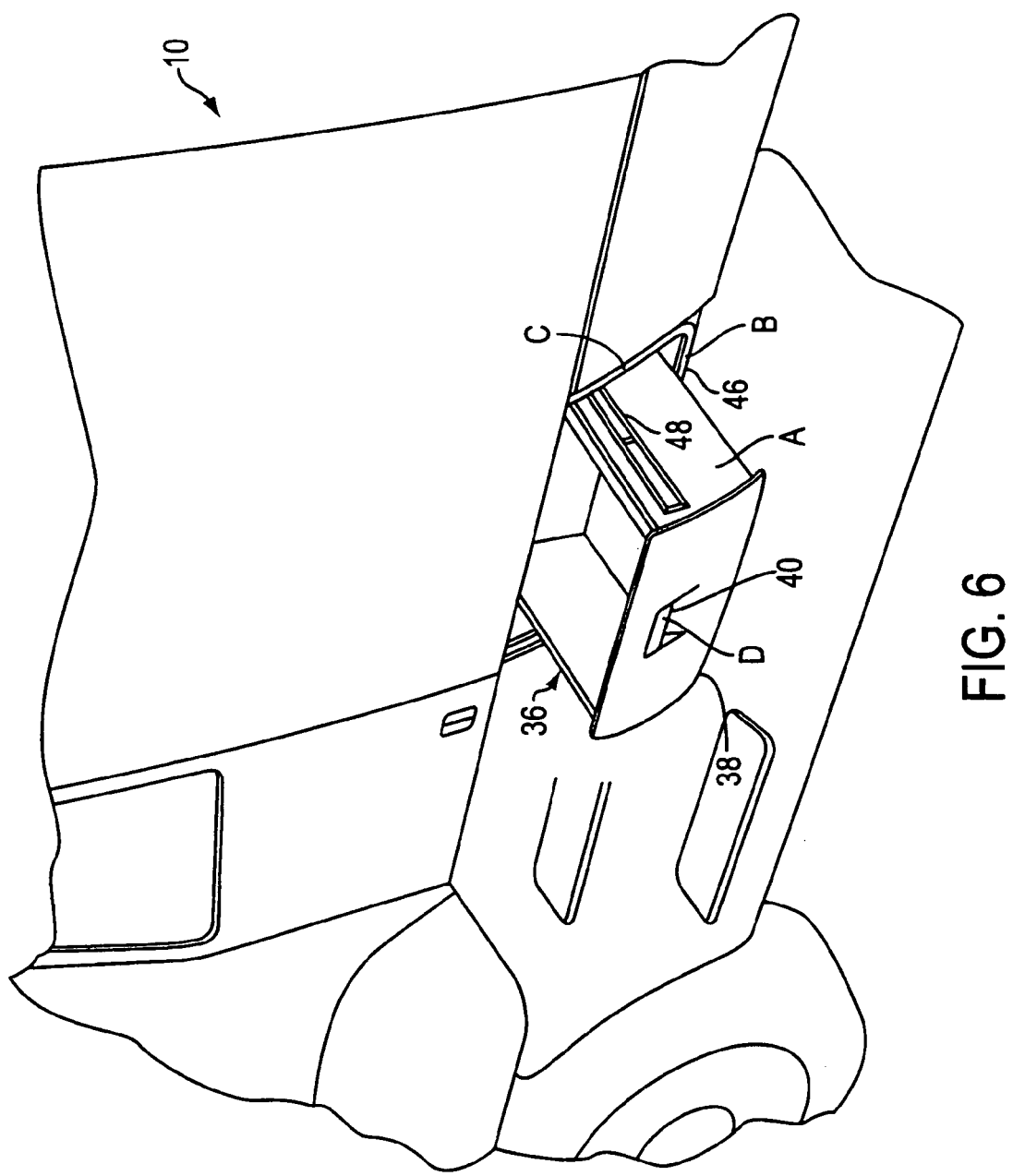
FIG. 6 is a fragmentary perspective view of the exterior of the modified forward module of FIG. 5 with a storage bin in an open position.

Drawers 36 are configured to fit conformally within storage areas 32 as shown in FIG. 3 and to slide out of the storage areas as shown on the left in FIG. 4 to permit items to be placed within the drawers outside the sleeping compartment for insertion into the storage areas defined by the sleeping compartment. Each of the drawers 36 includes an outboard panel 38 conforming in shape to the desired cross-sectional configuration of the module, with recessed handles 40 being formed in the outboard panel so as not to affect the desired contour of the module. While recessed handles are shown, any suitable handles can be used, including handles that protrude from the outboard panel. Outboard panel 38 of each drawer 36 extends downwardly beyond the bottom of the drawer to form a flange 42 for abutting a downturned lip 44 at the edge of each outboard floor portion 30 that functions as a positive stop when the drawer is fully inserted into the bin. Preferably, an elastomeric bumper or seal 46 is mounted between the lip of the outboard floor portion and the drawer flange as shown. One or both of the drawers 36 are preferably mounted on telescoping rails 48 as shown in FIG. 5 to reduce sliding friction when opening and closing the drawers. The telescoping rails 48 are attached to outboard portions 30 of floor 20 and are similar to the rails found in commercially available filing cabinets and the like. FIG. 6 is a fragmentary perspective view of a sleeping compartment 10 according to the present invention with a drawer 36 mounted on telescoping rails 48 in an open position. FIG. 6 also illustrates a conformal configuration of drawer panel 38, a recessed handle 40 with a latch, and a seal 46 that extends around the perimeter of the exterior access opening defined by the outboard floor portion.

Figure 7:
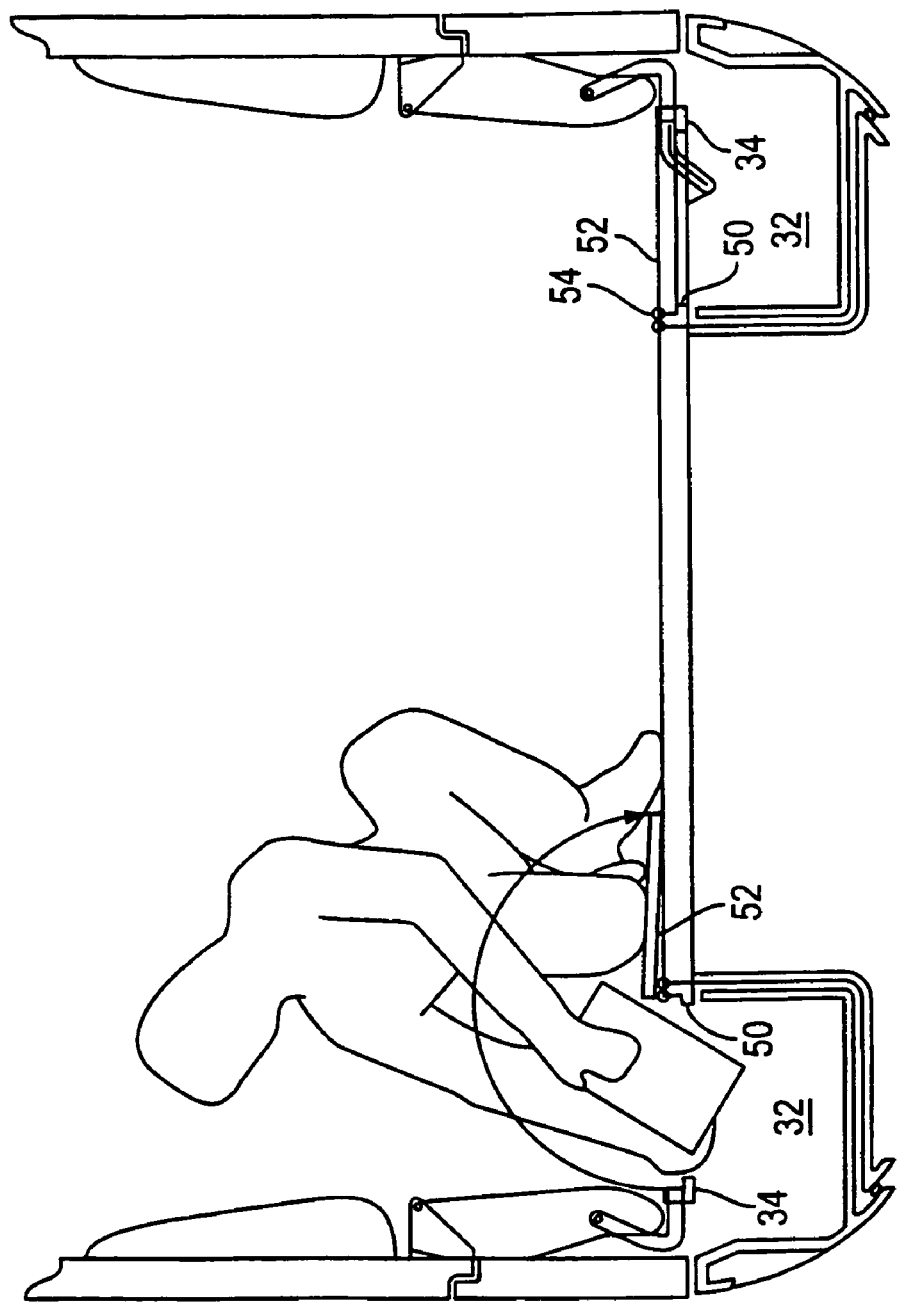
FIG. 7 is a sectional view of the forward module shown in FIG. 3 illustrating operation of a trap door to access the storage space beneath the floor of the module.

Referring again to FIGS. 2 and 3, each trap door 34 is shown as a rectangular panel hinged at 49 along a lateral edge of inboard floor portion 28 to permit the door to swing upwardly from the closed position. Any type of conventional hinge can be used including, but not limited to, piano hinges and living hinges formed using carpeting covering the floor assembly. An opening 50 is formed through each trap door 34 to receive a secondary door 52 providing access to the under-floor storage space through the trap door for reasons that will be explained below. Secondary door 52 is shown hinged to trap door 34 at 54 and preferably includes a latch 56 which, when engaged, causes the secondary door to move with the trap door as a unit. The latch can be manually disengaged (e.g., by pressing a button or sliding a bar) to allow the secondary door to move independently of the trap door. FIG. 7 shows secondary door 52 in a fully open position allowing a user to stow or retrieve items from the under-floor storage space 32 via opening 50 without moving trap door 34 from the closed position.

Figure 8:
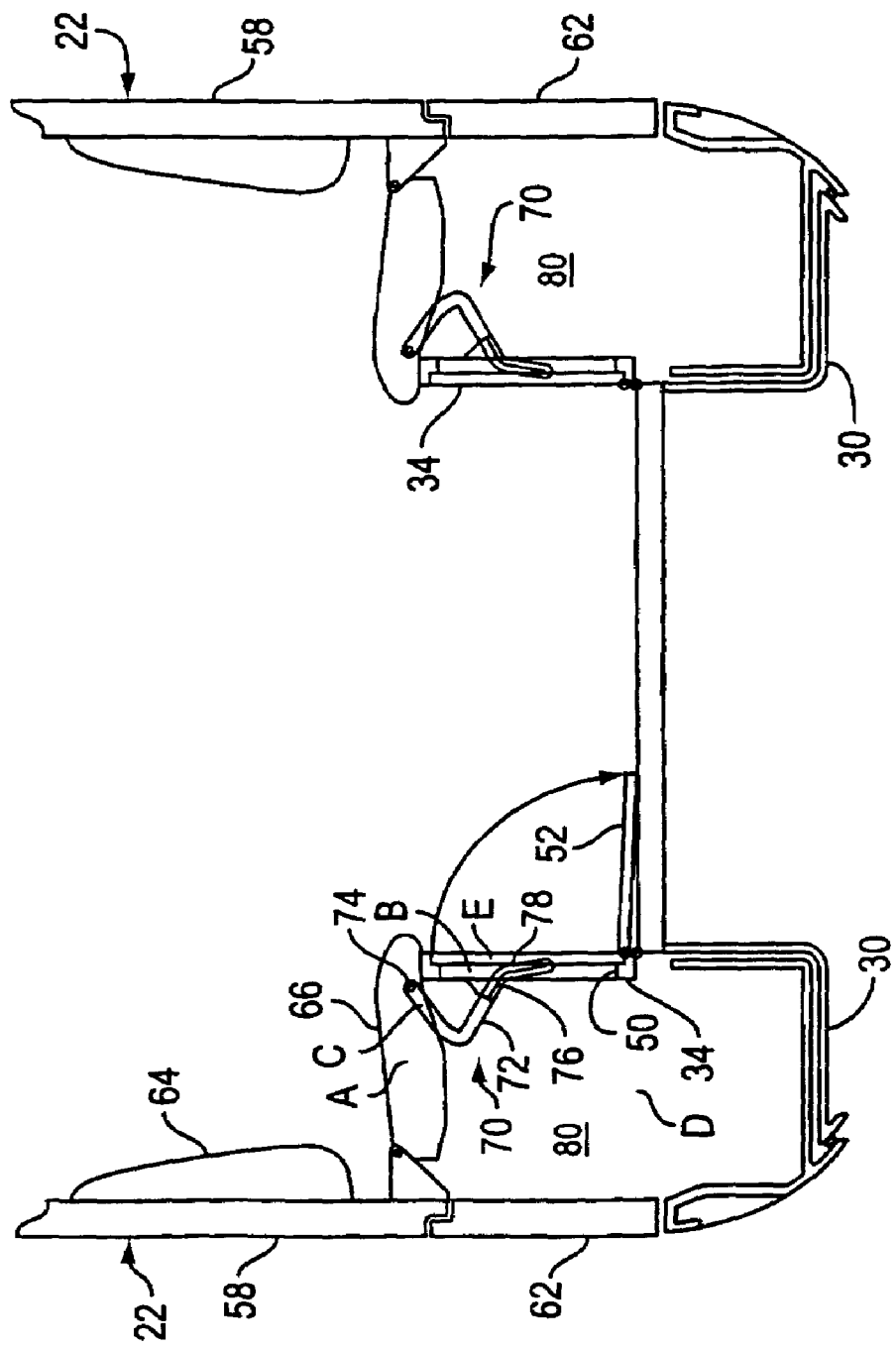
FIG. 8 is a sectional view of the forward module shown in FIG. 3 illustrating operation of the seats and use of the trap door to access the storage space beneath the floor of the module when the seats are deployed.

Referring again to FIGS. 2 and 3, each sidewall 22 of floor/sidewall module 14 includes a wall panel 58 and a seat 60 mounted on the wall panel. Seats 60 are shown in stowed positions in FIGS. 2 and 3. The embodiment shown in FIGS. 2 and 3 also includes an optional hatch 62 formed at a lower end of wall panel 58 to maximize available storage space as explained in greater detail below. Each seat 60 includes a seat back 64 mounted flush against an interior surface of sidewall panel 58 above the floor of the module and a seat bottom 66 hinged to the sidewall panel at 68 beneath the seat back so as to hang flush against the interior surface of the side wall panel in the stowed position. Seat bottom 66 can be pivoted upwardly from the stowed position, shown in FIG. 3, to a deployed or elevated or horizontal position, shown in FIG. 8, where the seat bottom extends substantially perpendicular from a lower end of seat back 64. Seat bottom 66 can be fixed in the horizontal position by pivoting trap door 34 upwardly to meet the seat bottom as shown in FIG. 8. Referring to FIGS. 3 and 8, an optional linkage 70 is shown connecting seat bottom 66 and trap door 34 so that pivotal movement of the seat bottom from the stowed position shown in FIG. 3 to the deployed position shown in FIG. 8 will automatically position the trap door to serve as a support for the seat bottom. Linkage 70 includes an arcuate arm 72 extending from a pivot 74 on seat bottom 66 and including a slot 76 receiving a slide 78 mounted on trap door 34. As seat bottom 66 is pivoted upwardly from the stowed position, arm 72 swings upwardly with the seat bottom, drawing trap door 34 upwardly from its closed position, shown in FIG. 3, to the open or elevated position shown in FIG. 8. Alternatively, the seat bottom and trap door can be free of any linkage, allowing a user to move one independently of the other. Regardless of whether a linkage is provided, the seat bottom can be configured to receive the opened trap door in mating relation such that the trap door supports the seat bottom in the deployed position to form a useable seat or chair.

Figure 9:
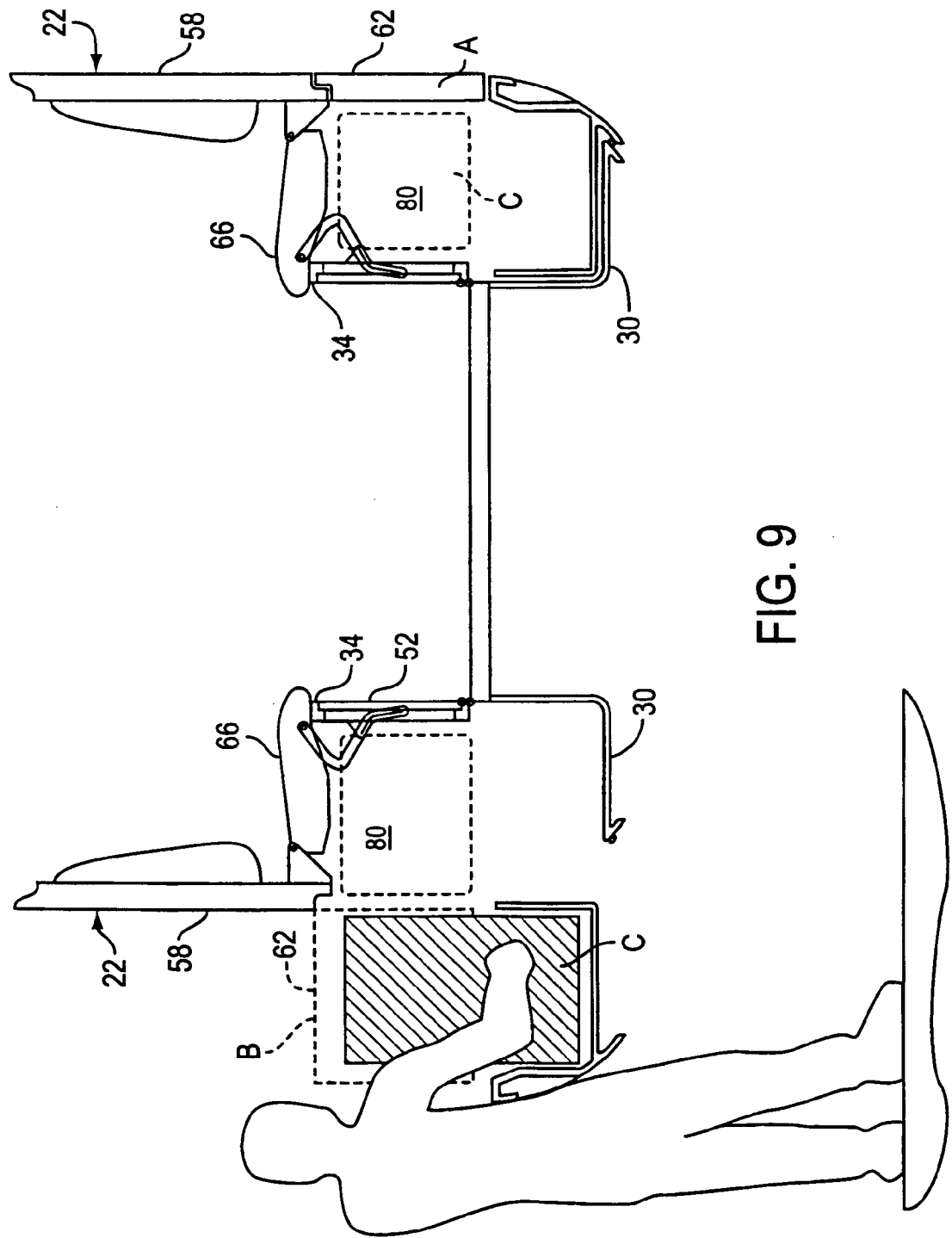
FIG. 9 is a sectional view of the forward module shown in FIG. 3 illustrating use of a hatch on the exterior of the module to stow large items in the storage space beneath the floor of the module when the seats are deployed.

It will be appreciated that deployment of seat bottom 66 and elevation of trap door 34 creates additional storage space 80 above outboard floor portions 30 as shown in FIGS. 8 and 9. Movement of trap door 34 as a unit to access this space is not possible since it is necessary for at least a portion of the door to remain in the elevated position to serve as a support for the seat bottom. However, if trap door 34 is provided with a secondary door 52 as described above, the additional storage space 80 can be accessed from inside the sleeper compartment via opening 50 by pivoting the secondary door outwardly as shown on the left in FIG. 8. Secondary door 52 is shown hinged along a bottom edge of door opening 50 but can be hinged along top or side edges of the opening, or configured to slide relative to the trap door, or to be completely removed. Since the secondary door is smaller than the trap door, the portion of the trap door defining the opening for the secondary door should be designed to bear the full weight of an individual sitting on the seat.

Figure 10:
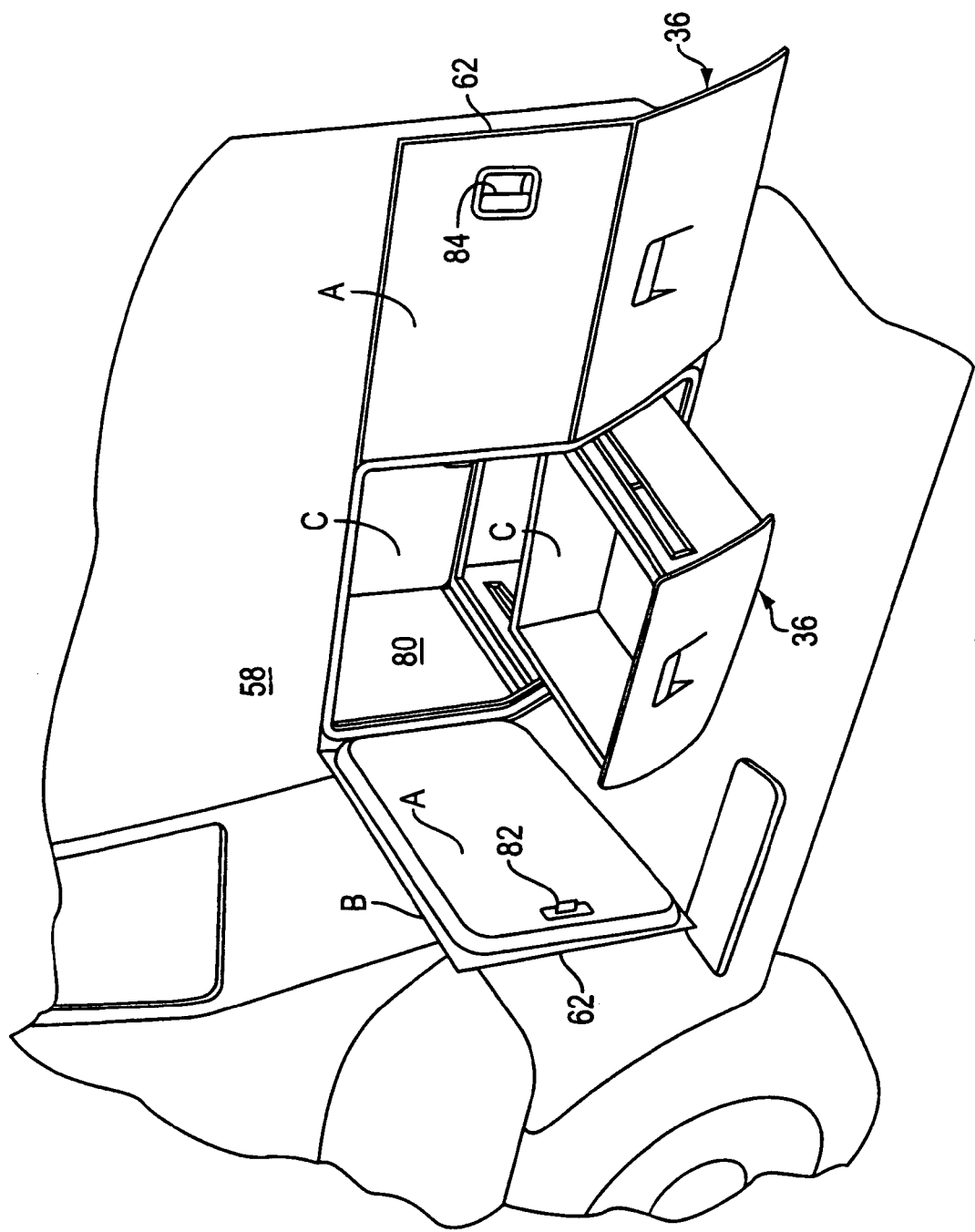
FIG. 10 is a fragmentary perspective view of the exterior of the forward module shown in FIG. 9 illustrating a hatch which is hinged to swing open in order to provide access to the additional storage space beneath the floor of the module when the seats are deployed.

Referring still to FIG. 8, it will be appreciated that the exterior access opening at the bottom of each sidewall 22 represents only a fraction of the total available height of the storage space when the seat bottom is deployed. Accordingly, a lower portion of sidewall panel 58 adjacent the exterior access opening is configured as a hatch 62 which can be repositioned or removed as shown in FIG. 9 in order to expand the size of the exterior access opening so that taller objects can be stowed and retrieved. Hatch 62 can be hinged to sidewall panel 58 to swing outwardly as shown in FIG. 10, can be configured to slide, or can be configured for complete removal. FIG. 10 also illustrates a latch 82 mounted on hatch 62 to engage mating structure adjacent the access opening when the hatch is closed, a handle 84 for disengaging the latch to allow the hatch to open, and a seal configuration wherein seal 46 extends about the perimeter of the expanded exterior access opening to form a seal with both the hatch and drawer 36.

Figure 11:
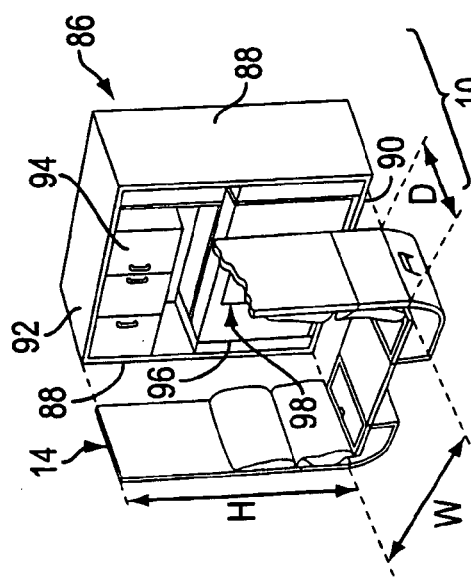
FIG. 11 is an exploded perspective view, partially broken, of another embodiment of a modular sleeping compartment having a modified rear module.

While an embodiment of the present invention including a rear module in the form of a wall panel has been shown, it will be appreciated that the rear module of the present invention can have other configurations incorporating amenities such as a bed, a table, shelving and storage cabinets in various combinations. In FIG. 11, a modified rear module 86 for use in forming a sleeping compartment according to the present invention is shown as an assembly made up of a pair of laterally spaced sidewalls 88 extending upwardly from a bottom panel 90 to a top panel 92 to define a frame of generally rectangular cross-section and a rear wall panel 93 covering an aft end of the frame to define an interior space for placement of amenities. The width and height of rear module 86 are chosen to match the respective width and height of the floor and sidewalls, respectively, of a forward module 14 so that a substantially continuous cross-section is maintained along the length of the sleeping compartment 10 formed when the modules are connected together. This also ensures compatibility with other modules having the same cross-sectional configuration.

Figure 16:
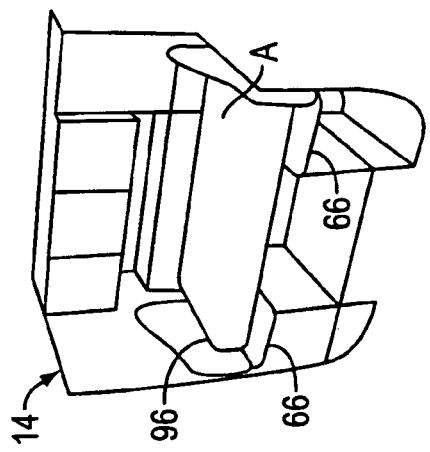
FIG. 16 is a fragmentary perspective view of the modular sleeping compartment of FIG. 12 with the bed deployed.
Figure 12:
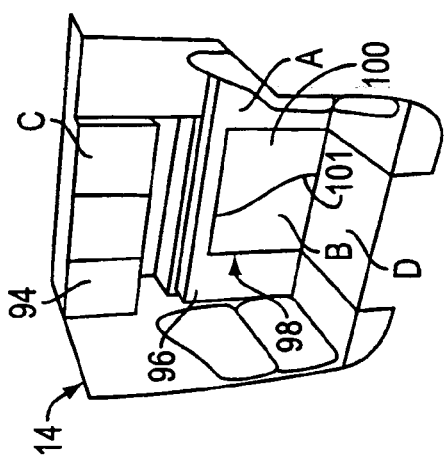
FIG. 12 is a fragmentary perspective view of the modular sleeping compartment of FIG. 11 in an assembled condition.

Referring still to FIG. 11, a plurality of cabinets 94 are shown disposed along the top of rear module 86. Two cabinets with a total of three doors are shown; however, the number of cabinets and doors can vary in accordance with consumer preferences. Cabinets 94 can be suspended from top panel 92, mounted on rear wall panel 93, or attached to both top and rear wall panels. A bed 96 located beneath cabinets 94 is moveable between a stowed position where the bed is folded against a rear of the module, as shown in FIGS. 11–15, and a deployed position where the bed forms a horizontal sleeping surface extending into the adjacent forward module, as shown in FIG. 16. In the embodiment shown in FIGS. 11–15, bed 96 is oriented such that its long axis extends laterally across the width of the rear module in both stowed and deployed positions to minimize the amount of forward clearance required to deploy the bed. The forward clearance required to deploy bed 96 can be provided by use of a module 14 of the type described above having a length or depth D equal to or greater than the width of the bed in order to permit the bed to be deployed. For a standard twin size bed oriented laterally as shown, a single forward module 14 having a width W of about 7 to 8 feet and a length or depth D of about 2 to 3 feet should be sufficient to allow deployment of the bed. FIG. 16 shows a laterally oriented bed 96 supported in a deployed position by laterally opposed seat bottoms 66 in adjacent forward module 14.

Figure 14:
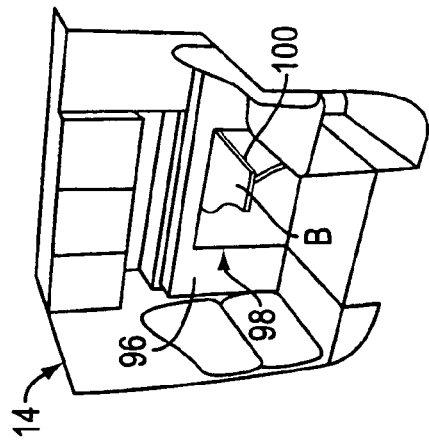
FIG. 14 is a fragmentary perspective view of the modular sleeping compartment of FIG. 12 with another individual table part deployed.
Figure 13:
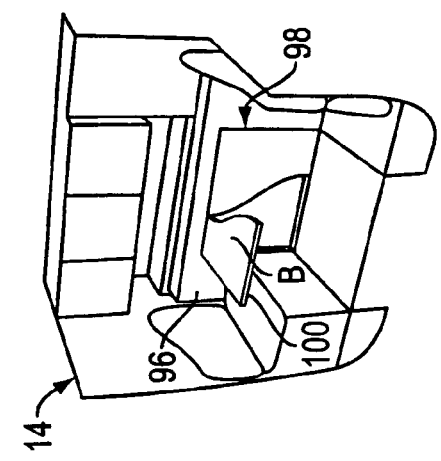
FIG. 13 is a fragmentary perspective view of the modular sleeping compartment of FIG. 12 with an individual table part deployed.
Figure 15:
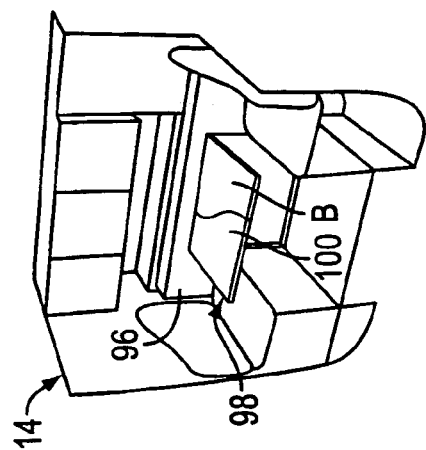
FIG. 15 is a fragmentary perspective view of the modular sleeping compartment of FIG. 12 with both table parts deployed to form a unitary table top.

FIGS. 11–15 also illustrate an optional table 98 formed in a bottom surface of bed 96. Table 98 is divided into two parts 100 by a curved separation 101 so that each table part is of varying depth across its width. Each table part 100 has an upper edge hinged to the bottom of bed 96 so that the table part can be pivoted from a stowed position substantially flush with the bottom of the bed to a deployed position extending substantially perpendicular to the stowed bed. FIGS. 13 and 14 show respective table parts deployed individually. Each table part 100 extends forwardly from rear module 86 in a deployed position for use by a person seated in an adjacent forward module 14. The curved edge of each table part formed by separation 101 provides a table surface of varying depth to permit larger objects to be supported if desired. FIG. 15 shows both table parts 100 deployed to form a single table of uniform depth. While table parts of varying depth are shown, it will be appreciated that the table can be made up of table parts of uniform depth or a single table part for use by one or more persons seated in an adjacent forward module.

Figure 18:
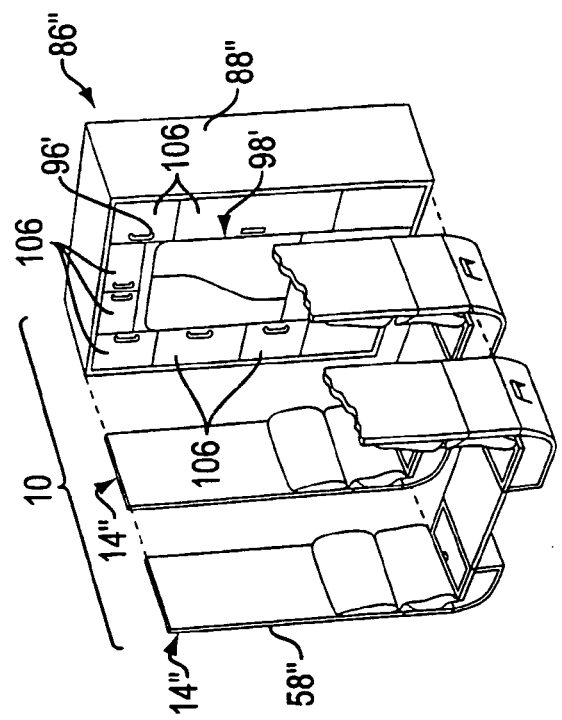
FIG. 18 an exploded perspective view, partly broken, of still another embodiment of a modular sleeping compartment having a modified rear module.
Figure 17:
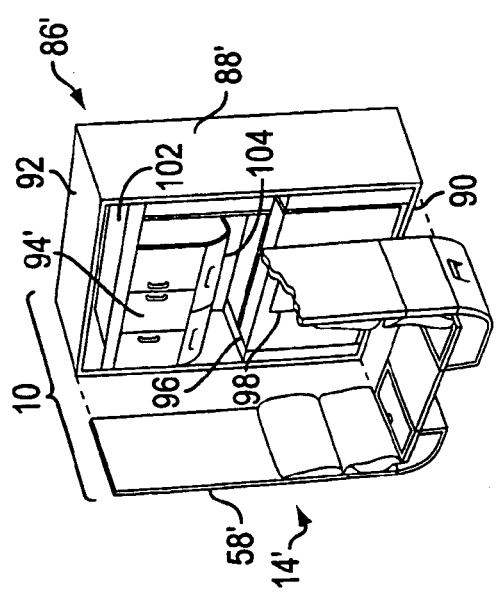
FIG. 17 is an exploded perspective view, partially broken, of yet another embodiment of a modular sleeping compartment having a modified rear module.
Figure 19:
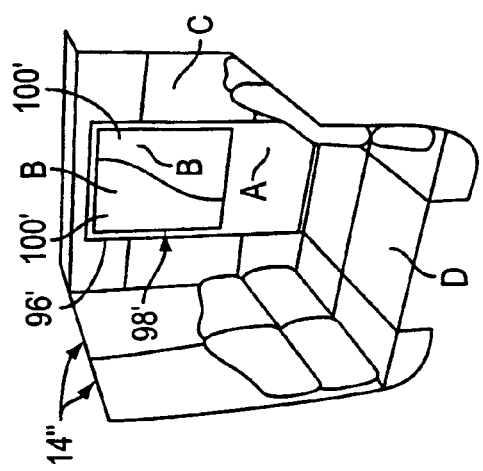
FIG. 19 is a fragmentary perspective view of the modular sleeping compartment embodiment of FIG. 18 in an assembled condition.

The sleeping compartment described above has a height H approximately equal to the height of the cab. It will be appreciated, however, that the sleeping compartment can be taller than the cab and that taller configurations provide additional space in the rear module for amenities. For example, in FIG. 17, a short mid-rise embodiment of a sleeping compartment 10 according to the present invention is shown wherein forward module 14' and rear module 86' have a height which is between the height of the cab and the height of a standard trailer towed by the truck. Forward module 14' is similar to module 14 described above but with taller sidewall panels 58'. In rear module 86', the bed 96 and table 98 are the same as described above; however, an upper row of cabinets 94' similar to those described above are vertically spaced from the top 92 of the rear module to provide open storage space 102 above the cabinets, and a lower row of cabinets 104 in the form of drawers are provided immediately beneath the upper row of cabinets. The added height is achieved by use of taller rear sidewall panels 88'. Because of the added height of the short mid-rise embodiment, the creation of additional storage space above and below the upper row of cabinets in the rear module does not substantially affect the amount of open space between the cabinets and the stowed bed. If the height of the sleeping compartment is increased further to a long high-rise embodiment as shown in FIGS. 18 and 19, sleeping compartment 10 can be as tall as a trailer disposed aft of the compartment.

Figure 21:
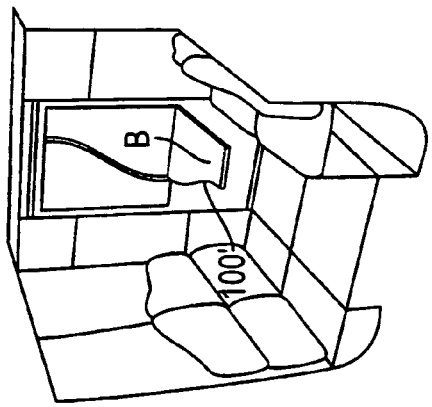
FIG. 21 is a fragmentary perspective view of the modular sleeping compartment of FIG. 19 with another single table part deployed.
Figure 20:
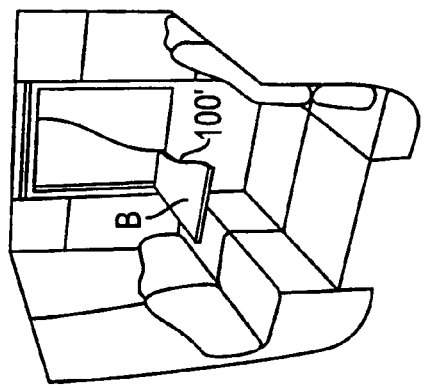
FIG. 20 is a fragmentary perspective view of the modular sleeping compartment of FIG. 19 with a single table part deployed.
Figure 22:
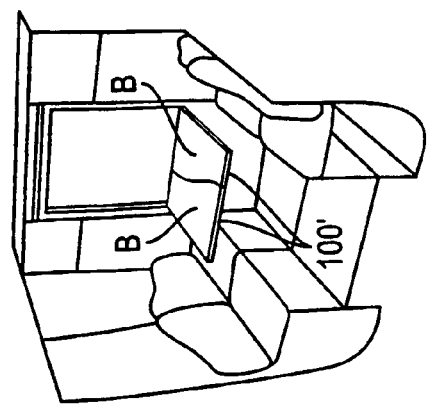
FIG. 22 is a fragmentary perspective view of the modular sleeping compartment of FIG. 19 with both table parts deployed to form a unitary table top.

Forward module 14" for the long high-rise embodiment is similar to modules 14 and 14' but with taller sidewall panels 58". Rear module 86" for the long high-rise embodiment is similar to modules 86 and 86' but with taller sidewalls 88" and a different bed/cabinet arrangement. The height of the long high-rise embodiment allows the bed 96' to be oriented longitudinally, as shown, with cabinets 106 positioned above and on opposite sides of the bed. Table 98' is essentially the same as described above but with individual table parts 100' hinged along their respective lower edges to fold downwardly from the stowed bed as shown in FIGS. 20–22. In FIGS. 20 and 21 the table parts 100' are shown deployed individually, and in FIG. 22 the table parts 100' are shown deployed together to define a unitary table. The added height of the long high-rise embodiment permits use of a longer bed 96' if desired; however, when folded out or deployed, a longer bed may extend completely through a single forward module of standard length.

The sleeping compartment can be lengthened to accommodate a longer bed (or, if a standard size bed is used, merely to increase available floor space) by increasing the number of forward modules disposed forward of the rear module. For example, the long high-rise embodiment of a sleeping compartment shown in FIG. 18 includes two forward modules 14". The forward modules 14" are each identical to the forward module 14 shown in FIG. 2 except for height. The forward modules are connected to one another in the same manner as described above for connection of the forward and rear modules. Alternatively, one or both of the forward modules can be replaced by similar modules without integral seating.

With an additional forward module 14", the long high-rise embodiment allows a longer bed 96' to fold out as shown in FIGS. 23–25 without extending beyond the sleeping compartment.

In FIG. 23, bed 96' is shown supported by a flap 108 extending upwardly from the floor of one of the forward modules 14". Spaces along lateral sides of bed 96' allow an operator to stand alongside the bed within the sleeping compartment. In FIG. 24, seat bottoms 66 on one side of bed 96' are folded out or deployed to about the same height as the bed to increase the effective width of the bed. Seat bottoms 66 on both sides of bed 96' are shown folded out or deployed in FIG. 25 to further increase the effective width of the bed to about that of a king-size bed.

FIGS. 23–25 also illustrate how the bed storage space 110 can be adapted to include shelving 112 to further increase the storage capacity of the sleeping compartment.

Figure 26:
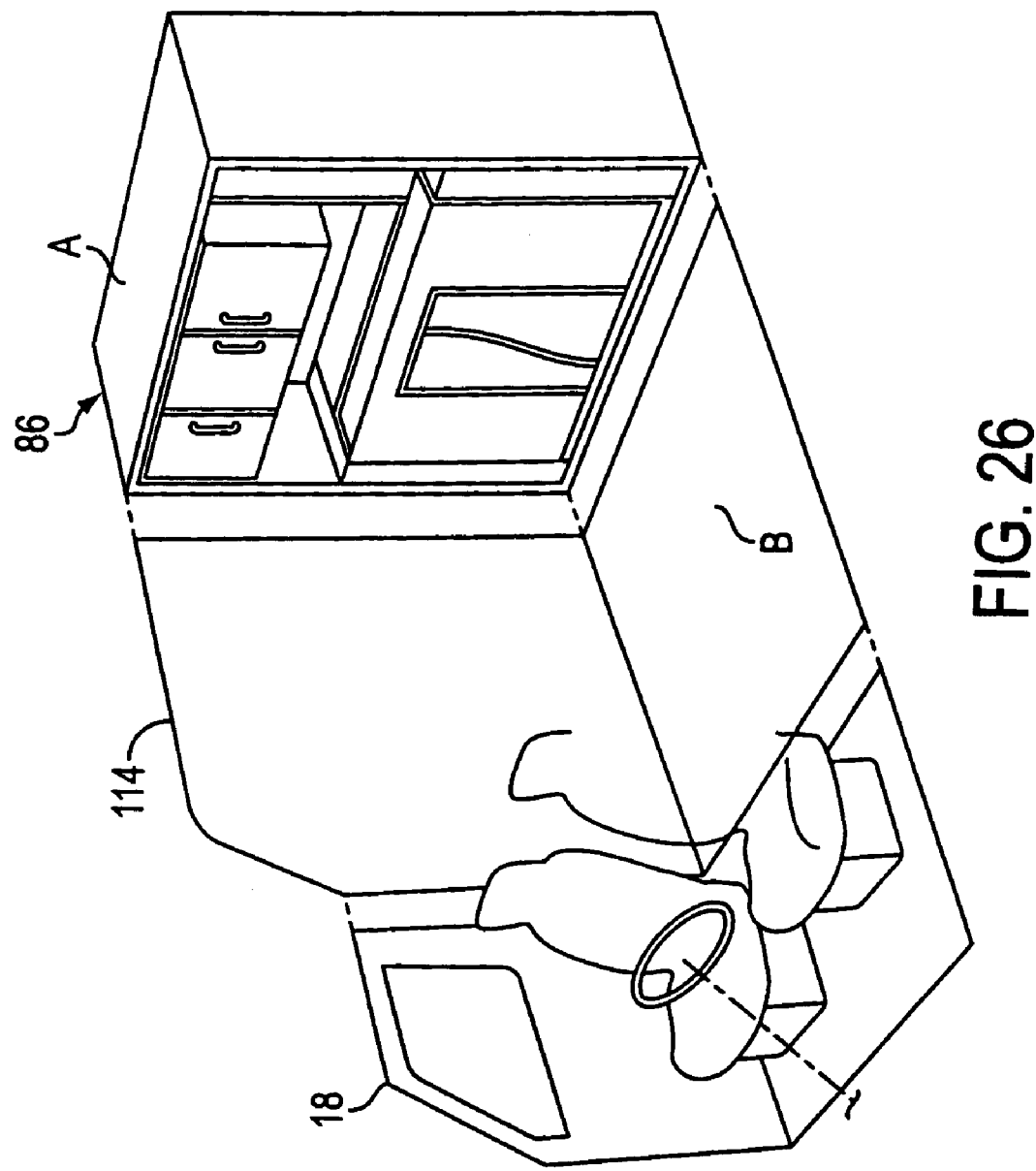
FIG. 26 is a perspective view, partly broken, of an embodiment of a sleeping compartment according to the present invention with a forward module having no seats.

As mentioned above, the sleeping compartment of the present invention can include one or more modules which are essentially the same as the forward modules but without seat backs or seat bottoms. FIG. 26 shows such an embodiment schematically wherein one or more intermediate modules 114 are used to create open floor space between a rear module 86 and the cab 18. The intermediate modules preferably include under floor storage like the forward modules with seats and may also include cabinets and other types of storage space along the side walls in lieu of seats. If desired, intermediate modules without seats can be combined with modules having seats to create a sleeping compartment according to the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts. For example, the specific arrangement of cabinets and open storage space in the rear module of the sleeping compartment can be varied. If desired, the rear module can be formed without cabinets, or without any open storage space. When cabinets are provided, they can be of the type having one or more doors, the type having one or more drawers, the type that rotate or pivot to open, or a combination of two or more of the foregoing or other cabinet types. A television and/or other types of entertainment equipment can be stowed in the cabinets or in open storage space. While tables made up of two parts are shown and described, it will be appreciated that a single unitary part or more than two parts can be used. Also, forward modules can be formed with two or more seats, only one seat, or no seats, if desired. The under-floor storage feature described in connection with the forward module and the various bed/table concepts described in connection with the rear module can be applied individually or in combination in any type of sleeping compartment regardless of whether a modular construction technique is used. Individual modules can be provided with roof panels or a roof panel can be installed as a separate component. The modules can be connected to one another and the cab in any conventional manner. For example, opposed edges of adjacent modules can be formed with flanges that abut one another to facilitate welding or installation of fasteners such as bolts, screws or rivets. By way of further example, brackets can be mounted across the joint between modules on the interior and/or exterior of the sleeping compartment. Alternatively, or in addition to the foregoing, opposed edges of adjacent modules can be configured to mechanically couple with one another, for example by forming an edge of one module to fit telescopically within an opposed edge of an adjacent module. The various walls, panels and doors of the modules can be solid or constructed using frames which are covered by sheets of material or a combination of solid and frame construction. The module components can be formed using any suitable materials but are preferably formed of metal and plastic materials of the type conventionally used in fabricating sleeping compartments for trucks.

What is claimed is:

1. A sleeping compartment for a truck having a cab mounted on a chassis frame, said sleeping compartment comprising
   a floor with lateral portions and a pair of sidewalls extending upwardly from said lateral portions of said floor;
   a seat mounted on one of said sidewalls and including a seat back fixed to said one sidewall and a seat bottom moveable from a substantially vertical stowed position adjacent said one sidewall and a substantially horizontal deployed position projecting from said one sidewall; and
   a seat support mounted on said floor and movable from a stowed position substantially flush with said floor to a deployed position protruding upwardly from said floor to support said seat bottom in said deployed position.

2. The sleeping compartment of claim 1, wherein said seat support includes a panel hinged to said floor, and wherein a corresponding outboard portion of said floor extends downwardly from said panel to define a storage space beneath said panel.

3. The sleeping compartment of claim 2, further comprising a first access opening in an exterior of said one sidewall in communication with said storage space.

4. The sleeping compartment of claim 3, further comprising a storage bin disposed in said storage space and accessible from outside said compartment via said access opening in said one sidewall.

5. The sleeping compartment of claim 3, wherein said seat bottom and said support define additional space above said outboard storage space when deployed, and further comprising an access panel mounted over a second access opening in an exterior of said sidewall at a location corresponding to said additional space, said access panel being moveable between a closed position covering said second access opening and an open position exposing said second access opening to provide access to the additional space.

6. The sleeping compartment of claim 5, wherein said first and second access openings are contiguous.

7. The sleeping compartment of claim 2, wherein a third access opening is formed through said panel and further comprising a secondary panel moveable between a closed position covering said third access opening and an open position permitting access to said storage space through said third access opening.

8. The sleeping compartment of claim 7, and further comprising a linkage connecting said seat bottom and said panel such that said seat bottom and said panel move together between said stowed and deployed positions.

9. The sleeping compartment of claim 8, wherein said linkage includes an arm with a slot extending between said seat bottom and said panel, and a slide mounted on one of said seat bottom and said panel and disposed within said slot.

10. The sleeping compartment of claim 1, further comprising a rear assembly connected to rear edges of said floor and said sidewalls.

11. The sleeping compartment of claim 10, wherein said rear assembly includes at least one of a bed, a table, and a cabinet.

12. The sleeping compartment of claim 10, wherein said rear assembly includes a bed mounted on said rear assembly for movement between a substantially vertical stowed position adjacent said rear assembly and a substantially horizontal extended position projecting from said rear assembly.

13. The sleeping compartment of claim 12, further comprising a table mounted on a bottom surface of said bed for movement between a stowed position against said bottom surface and a substantially horizontal extended position projecting from said bottom surface when said bed is stowed.

14. The sleeping compartment of claim 10, wherein said rear assembly includes a table mounted on said rear wall assembly for movement between a substantially vertical stowed position adjacent said rear wall assembly and a substantially horizontal extended position projecting from said rear wall assembly.

15. The sleeping compartment of claim 14, wherein said table includes plural table portions which are independently moveable between stowed and extended positions.

16. The sleeping compartment of claim 15, wherein said table portions include curved edges opposing one another when the table portions are both in stowed or 3 extended positions.

17. The sleeping compartment of claim 11, wherein said floor, side walls, and seat are part of a first module, said rear assembly is part of a second module, and said first and second modules are manufactured separately and joined together to form said sleeping compartment.

18. A sleeping compartment assembly comprising:
a) a truck having a cab mounted on a chassis frame, a sleeping compartment comprising:
a floor with lateral portions and a pair of sidewalls extending upwardly from said lateral portions of said floor;
a rear wall assembly connected to an aft end of said floor and sidewalls;
and a stowable member comprising a seat mounted on one of said sidewalls and including a seat back fixed to said one sidewall and a seat bottom moveable from a substantially vertical stowed position adjacent said one sidewall and a substantially horizontal deployed position projecting from said first sidewall, and a seat support mounted on said floor and movable from a stowed position substantially flush with said floor to a deployed position protruding upwardly from said floor to support said seat bottom in said deployed position; and b) a bed with a sleeping surface mounted on said rear wall assembly for movement between a stowed position where said sleeping surface is oriented vertically and a deployed position where said sleeping surface is oriented horizontally, wherein, when said sleeping surface is horizontally oriented, said sleeping surface does not extend beyond said sleeping compartment into said cab compartment.

\* \* \* \* \*